(12) United States Patent
Wei (10) Patent No.: US 10,745,094 B2
(45) Date of Patent: Aug. 18, 2020

(54) UNDERWATER PROPELLER AND SUBMERSIBLE

(71) Applicant: TIANJIN DEEPFAR OCEAN TECHNOLOGY CO., LTD., Tianjin (CN)

(72) Inventor: Jiancang Wei, Tianjin (CN)

(73) Assignee: TIANJIN DEEPFAIR OCEAN TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 16/336,906

(22) PCT Filed: Apr. 17, 2018

(86) PCT No.: PCT/CN2018/083404
§ 371 (c)(1),
(2) Date: Mar. 26, 2019

(87) PCT Pub. No.: WO2018/201890
PCT Pub. Date: Nov. 8, 2018

(65) Prior Publication Data
US 2020/0031445 A1    Jan. 30, 2020

(30) Foreign Application Priority Data

May 5, 2017    (CN) .................... 2017 2 0493127 U (51) Int. Cl.
*B63G 8/16*    (2006.01)
*B63H 21/17*    (2006.01)
(Continued)

(52) U.S. Cl.
CPC ............... *B63G 8/16* (2013.01); *B63H 21/17* (2013.01); *B63H 23/02* (2013.01); *B63H 23/24* (2013.01);
(Continued)

(58) Field of Classification Search
CPC .......... B63G 8/16; B63H 21/17; B63H 23/02; B63H 23/24; B63H 2005/075; F16C 27/08
See application file for complete search history.

(56) References Cited

U.S. PATENT DOCUMENTS 4,783,608 A * 11/1988 Gruber ................. H02K 5/1675
                                                    310/43
7,061,147 B2 * 6/2006 Ries ....................... B63H 5/125
                                                    310/51
(Continued)

FOREIGN PATENT DOCUMENTS

CN    103818535 A    5/2014
CN    105235844 A    1/2016
(Continued)

OTHER PUBLICATIONS

International Search Report dated Jun. 28, 2018 from SIPO issued on PCT/CN2018/083404.

*Primary Examiner* — Stephen P Avila
(74) *Attorney, Agent, or Firm* — Franklin & Associates International Inc; Matthew Lambrinos (57) ABSTRACT

Provided is a propeller for a submersible, comprising a housing (1) having a cylindrical structure with two open ends, a stator sleeve (2) having a cylindrical structure with one open end, the stator sleeve suspended in an internal cavity of the housing (1), a motor stator (3) fixed inside the stator sleeve (2), a rotor sleeve (4) having a cylindrical structure with one open end and disposed on the stator sleeve (2), a motor rotor (5) fixed to an inner wall of the rotor sleeve (4), and a propeller (6) fixed to an outer wall of the rotor sleeve (4). The propeller (6) of the underwater propeller is directly fixed to the rotor sleeve (4) so that the structure of
(Continued)

the motor is compact, and the rotational shaft transmission is not required so that the length of the propeller is shortened and the volume is reduced.

12 Claims, 6 Drawing Sheets

(51) Int. Cl.
*B63H 23/02* (2006.01)
*B63H 23/24* (2006.01)
*B63H 5/07* (2006.01)
*F16C 27/08* (2006.01)

(52) U.S. Cl.
CPC ........ *B63H 2005/075* (2013.01); *F16C 27/08* (2013.01)

(56) References Cited

U.S. PATENT DOCUMENTS

| | | | | |
|---|---|---|---|---|
| 8,461,711 B2* | 6/2013 | Greyshock | ............... | F03B 13/00 |
| | | | | 290/54 |
| 2009/0115263 A1* | 5/2009 | Ihara | ........................ | B60K 6/26 |
| | | | | 310/96 |

FOREIGN PATENT DOCUMENTS

| | | | |
|---|---|---|---|
| CN | 106061835 | A | 10/2016 |
| CN | 205652317 | U | 10/2016 |
| CN | 206968956 | U | 2/2018 |
| WO | 2015117231 | A1 | 8/2015 |

\* cited by examiner

UNDERWATER PROPELLER AND SUBMERSIBLE

CROSS-REFERENCE TO RELATED APPLICATIONS

The present application is a National Stage of International Patent Application No. PCT/CN2018/083404, Apr. 17, 2018, which claims the priority and all benefits of the Chinese patent application No. 201720493127.0 filed on May 5, 2017, entitled "Underwater Propeller and Submersible", and hereby incorporated by reference in its entirety.

BACKGROUND

The present application relates to the technical field of power equipment, in particular to an underwater propeller and a submersible.

A propeller refers to a power equipment of an ROV (Remote Operated Vehicle). The ROV inputs electric power to the propeller which converts the input electric energy into the rotating mechanical energy of the propeller, thus pushing the ROV to move underwater.

A conventional underwater propeller comprises a sealed cabin, a motor and a driving device thereof, a propeller, and a dome, etc. Usually, the finished motor (sometimes a speed reducer is additionally arranged in front of the motor for practical needs) and driving device thereof are put into the sealed cabin, and the extending shaft of the driving device is used to drive the propeller to rotate to generate thrust.

Upon studying the prior art, the applicant found that the prior propeller has a large volume, especially in the axial direction because the motor is connected with the propeller through a shaft.

SUMMARY

To solve the problems of the propeller indicated in the Background, the present application discloses a propeller and a submersible.

In order to solve the technical problems as mentioned above, one embodiment of the present application discloses an underwater propeller, comprising a housing having a cylindrical structure with two open ends, a stator sleeve having a cylindrical structure with one open end, the stator sleeve suspended in an internal cavity of the housing, an interval disposed between an outer wall of the stator sleeve and an inner wall of the housing, a motor stator fixed inside the stator sleeve, a rotor sleeve having a cylindrical structure with one open end and disposed on the stator sleeve, a gap disposed between an inner wall of the rotor sleeve and an outer wall of the stator sleeve, the rotor sleeve rotationally connected with the stator sleeve, an bottom of the rotor sleeve rotationally connected with the housing, a motor rotor fixed to the inner wall of the rotor sleeve, a propeller fixed to the outer wall of the rotor sleeve, and maximum diameter of the propeller smaller than inner diameter of the housing.

Optionally, a first bearing may be provided between the inner wall of the rotor sleeve and the outer wall of the stator sleeve.

Optionally, the housing may comprises a cylinder having a cylindrical structure with two open ends, and coaxial with the housing; a mounting base having an annular structure coaxial with the cylinder and an outer wall of the annular structure of the mounting base fixed to an inner wall of the cylinder through a plurality of supporting members; a support frame, which is two concentric rings connected through a plurality of support rods, the support frame fixed at an opening position at one end of the cylinder and disposed with a support hole which is coaxial with the cylinder.

Optionally, the opening of the stator sleeve may be sealingly fixed with the end face of the mounting base. The rotor sleeve may have a consistent opening direction with the stator sleeve and be coaxial with the stator sleeve.

Optionally, the underwater propeller may further comprise a convex shaft arranged on the outer wall of the rotor sleeve bottom and coaxial with the rotor sleeve; a second bearing arranged in the support hole in which the convex shaft is rotatably arranged in a support hole on the support frame through the second bearing.

Optionally, the underwater propeller may further comprise a first seal, wherein the first seal is sealingly fixed to the inner wall of the mounting base to seal the space between the stator sleeves.

Optionally, the underwater propeller may further comprise a circuit board located in an internal cavity of the mounting base; a cable, of which one end is connected with the circuit board, and the other end connected with the motor stator through the first seal, wherein a space between the cable and the first seal is sealed; a second seal located at an opening position of one end of the mounting base away from the stator sleeve, and used for sealing the internal cavity of the mounting base.

Optionally, the underwater propeller may further comprise an end cover, which is two concentric rings connected through a plurality of support rods, and fixed at an opening position of one end of the cylinder away from the support frame.

Optionally, the support frame and the end cover are both fixed to the cylinder through threaded connection.

Optionally, the inner wall of the stator sleeve is disposed with a plurality of convex ribs; external diameter of the motor stator matches with the inner wall of the stator sleeve, and a plurality of grooves matching with the convex ribs are arranged on the outer wall of the motor stator for fixing the motor stator in the stator sleeve.

Optionally, pitch of the propeller is 100 mm to 135 mm.

One embodiment of the present application further provides a submersible comprising an underwater propeller of any one of the foregoing.

The technical solutions of the present application may comprise the following beneficial effects:

According to the underwater propeller disposed by the present application, improvement is made directly to the structure of the motor by installing the stator of the motor in the stator sleeve, and fixing the rotor of the motor in the rotor sleeve, with the rotor sleeve capable of rotating around the stator sleeve. Moreover, in the underwater propeller according to the above embodiments, the propeller is directly fixed to the outer wall of the rotor sleeve, so that the rotor sleeve can be driven to rotate when the motor rotor rotates, thereby driving the propeller fixed to the rotor sleeve.

In this underwater propeller, the propeller is fixed to the rotor sleeve directly, so that the structure of the motor is very compact without shaft transmission, so that the length of the underwater propeller in the axial direction is greatly reduced, and the overall volume of the underwater propeller can be further reduced.

It would be appreciated that the above general description and the following detailed description are exemplary and explanatory merely without limiting to the scope of the present disclosure.

BRIEF DESCRIPTION OF THE DRAWINGS

The accompanying drawings, which are incorporated in and constitute a part of this specification, embodiments consistent with the present application are illustrated and together with the description serve to explain the principles of the present application.

In order to explain the technical solution in the embodiments or Background of the present application more clearly, the drawings to be used in the embodiments or the Background will be briefly described below. Obviously, for one of ordinary skill in the art, other drawings can be obtained according to these drawings without creative labor.

Reference numerals: housing 1, stator sleeve 2, motor stator 3, rotor sleeve 4, motor rotor 5, propeller 6, first bearing 7, second bearing 8, convex shaft 9, cylinder 101, mounting base 102, support frame 103, support hole 104, support 105, first seal 10, end cover 11, stator fixing base 12, stator support plate 13, arc plate 14, stator bearing mounting groove 15, first dome 16, second dome 17, diversion channel 18, rotor bearing mounting groove 19, second seal 20, circuit board 21 and convex ribs 22.

DETAILED DESCRIPTION

In order to enable those skilled in the art to understand the technical solution in the present application better, the technical solution in the embodiments of the present application will be described clearly and completely with the drawings in the embodiments of the present application below. Obviously, the embodiments described herein below are merely part of but not all the embodiments of the present application. Based on the embodiments of the present application, other embodiments obtained by ordinary skilled in the art without inventive efforts shall fall within the scope of protection claimed in the present application.

Figure 1:
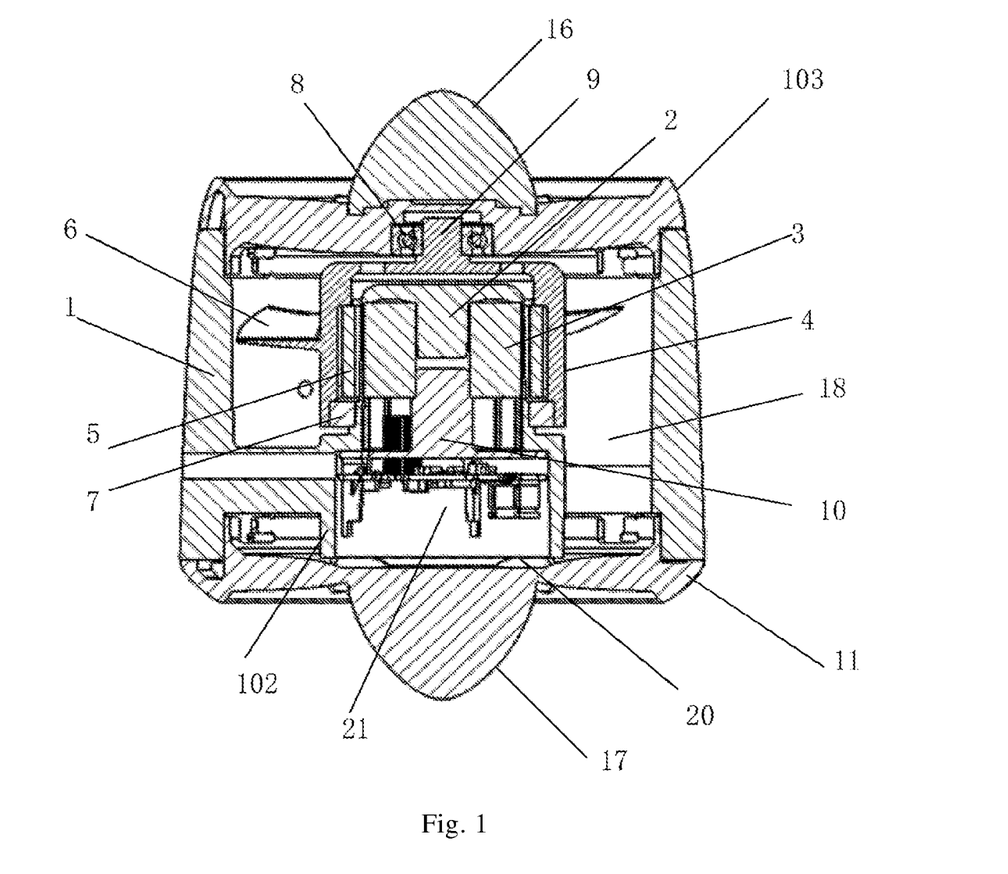
FIG. 1 shows a schematic sectional view of an underwater propeller according to an embodiment of the present application.
Figure 2:
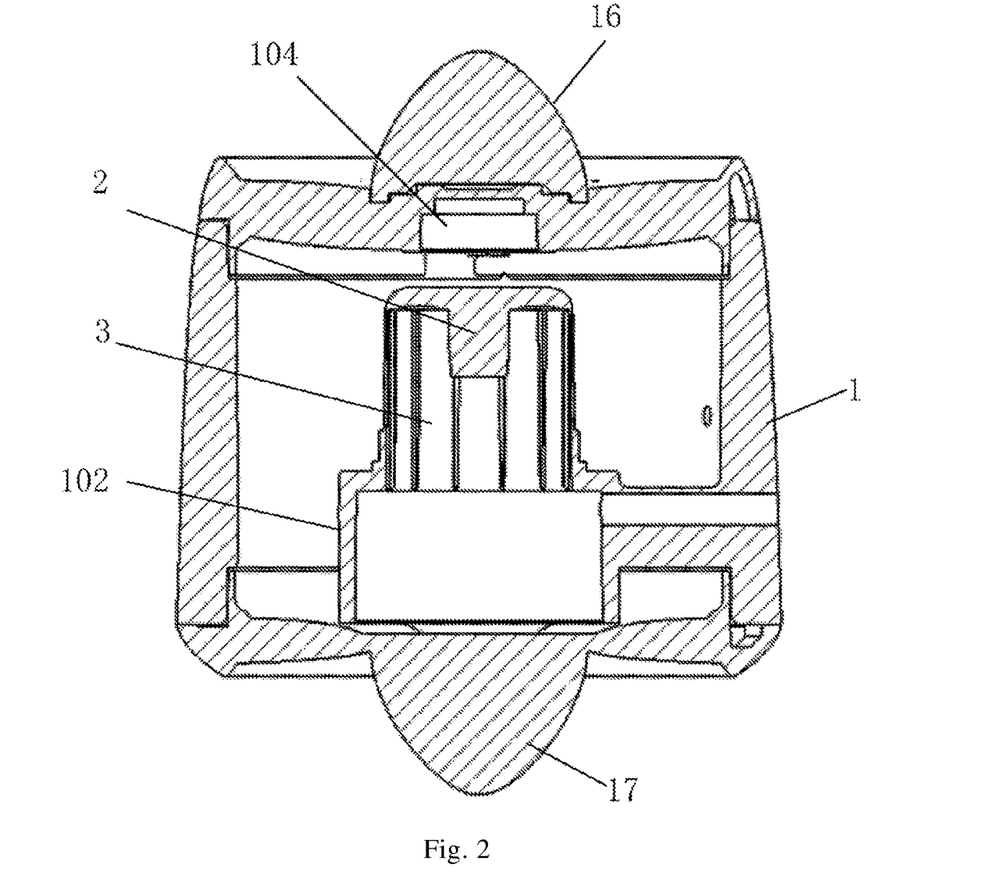
FIG. 2 shows a schematic partial sectional view of an underwater propeller according to an embodiment of the present application.
Figure 3:
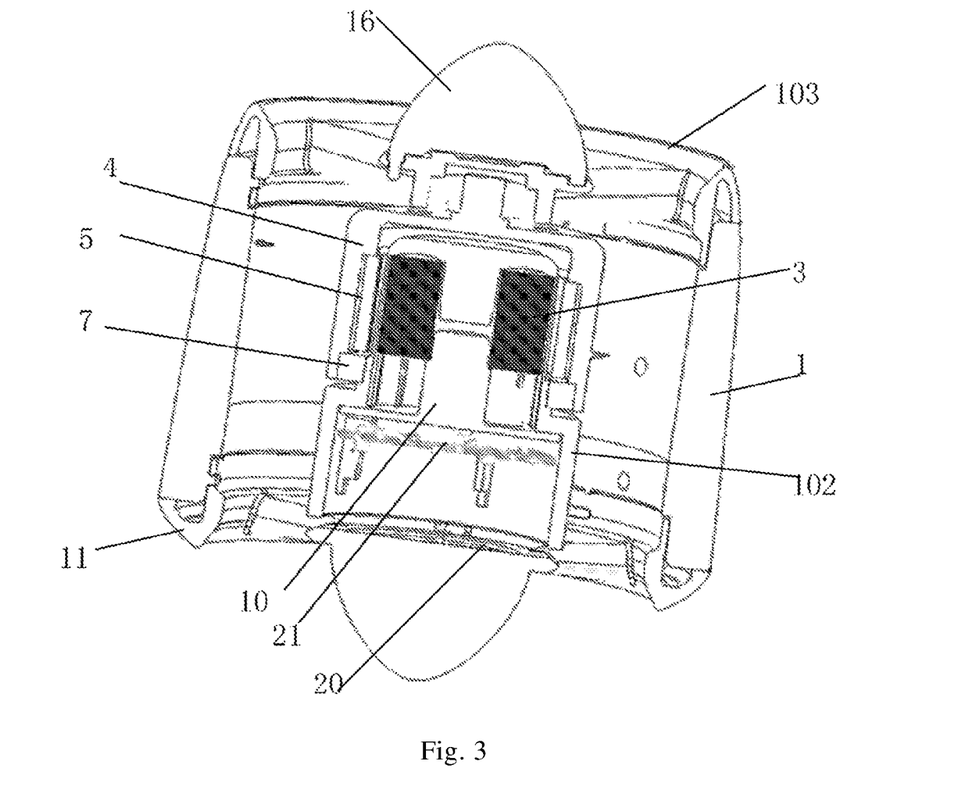
FIG. 3 shows a schematic cross-sectional view of an underwater propeller according to an embodiment of the present application.
Figure 4:
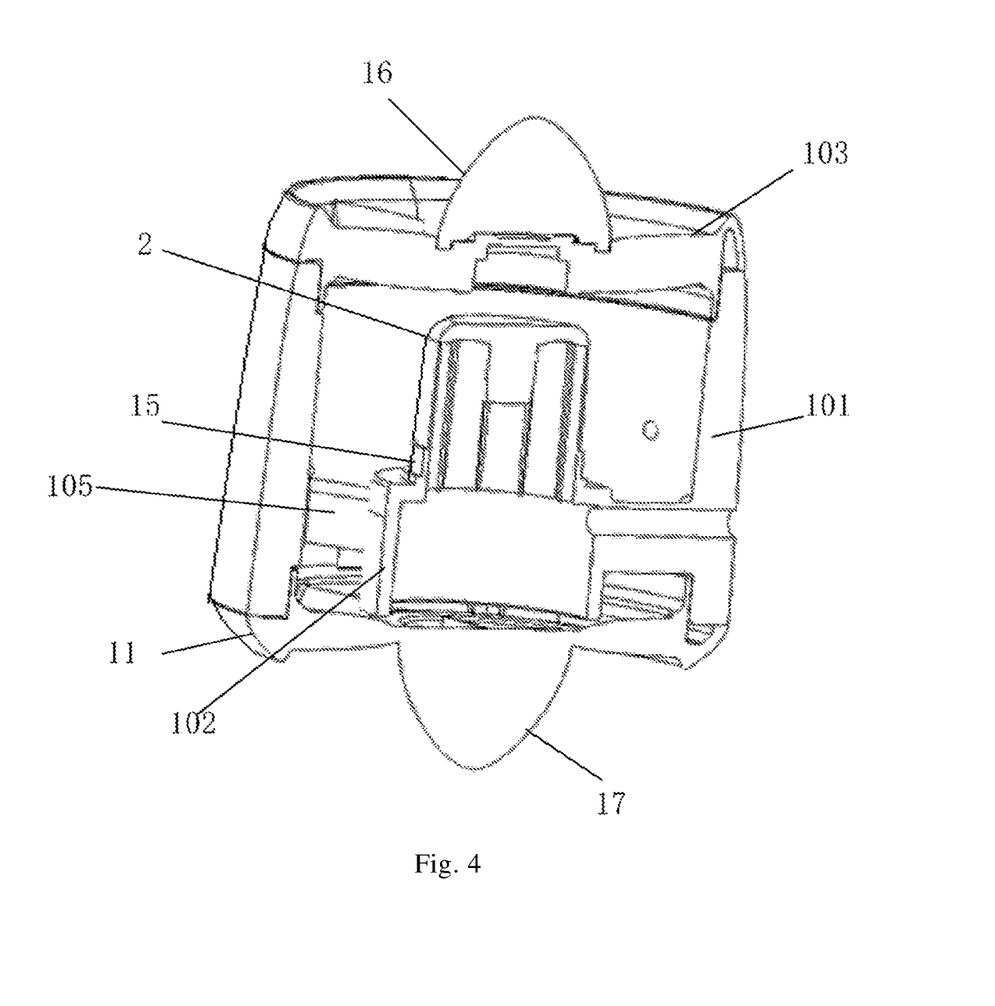
FIG. 4 shows a schematic partial cross-sectional view of an underwater propeller according to an embodiment of the present application.
Figure 5:
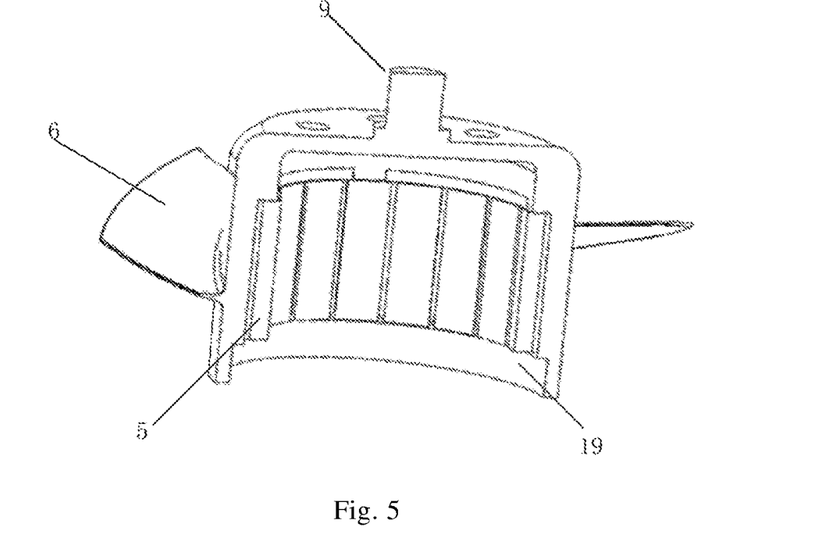
FIG. 5 shows a schematic cross-sectional view of a rotor sleeve according to an embodiment of the present application.
Figure 6:
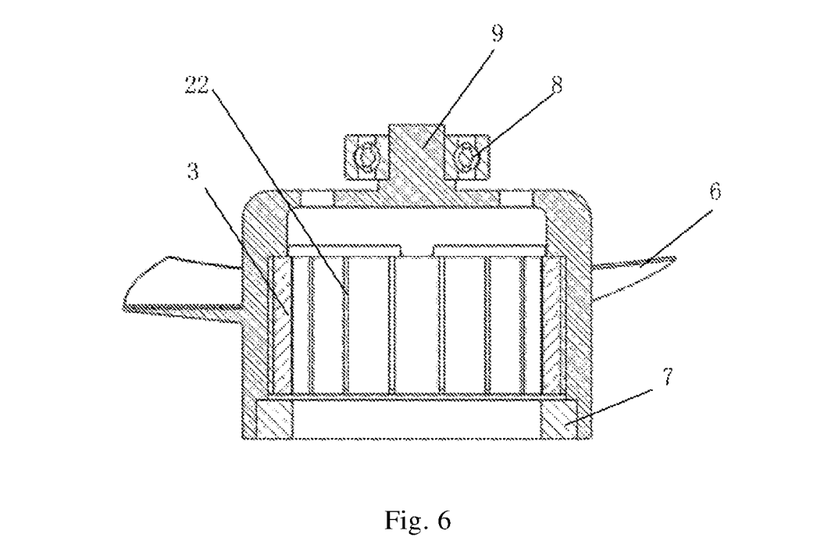
FIG. 6 shows a schematic sectional view of a rotor sleeve according to an embodiment of the present application.

FIG. 1 shows a schematic sectional view of an underwater propeller according to an embodiment of the present application. FIG. 2 shows a schematic partial sectional view of an underwater propeller according to an example of the present application. FIG. 3 shows a schematic cross-sectional view of an underwater propeller according to an embodiment of the present application. FIG. 4 shows a schematic partial cross-sectional view of an underwater propeller according to one embodiment of the present application.

As shown in FIGS. 1 to 4, the underwater propeller includes a housing 1, a stator sleeve 2, a motor stator 3, a rotor sleeve 4, a motor rotor 5 and a propeller 6.

The housing 1 has a cylindrical structure with two open ends. The housing 1 serves as an integral support structure of the underwater propeller. The stator sleeve 2, the motor stator 3, the rotor sleeve 4, the motor rotor 5 and the propeller 6 are all disposed inside the housing 1.

The stator sleeve 2 has a cylindrical structure with one open end. The stator sleeve 2 accommodates and fixes therein the motor stator 3. The stator sleeve 2 may be suspended in an inner cavity of the housing 1 by supporting parts such as rods or plates. Alternatively, an interval is disposed between an outer wall of the stator sleeve 2 and an inner wall of the housing 1. The interval is annular and can be used as a diversion channel 18, which facilitates the passage of water in the housing 1.

The motor stator 3 is fixed inside the stator sleeve. Various fixing mode may be available, so long as no relative rotation or movement occurs between the motor stator 3 and the stator sleeve 2.

The rotor sleeve 4 has a cylindrical structure with one open end. The rotor sleeve 4 is disposed on the stator sleeve 2 and matched with the stator sleeve. The rotor sleeve 4 is rotatably connected with the stator sleeve 2. The bottom of the rotor sleeve 4 is rotatably connected with the housing. An interval is disposed between an inner wall of the rotor sleeve 4 and an outer wall of the stator sleeve 2 so that the rotor sleeve can rotate around the stator sleeve 2. The axis of the rotor sleeve 4 coincides with the axis of the stator sleeve 2, which ensures the stability of the rotor sleeve 4 during its rotation.

The motor rotor 5 is fixed to the inner wall of the rotor sleeve. When the rotor sleeve 4 rotates around the stator sleeve 2, the motor rotor 5 does not rub against the stator sleeve 2. Thus, when alternating current passes through the motor stator 3, the motor rotor 5 can drive the rotor sleeve 4 to rotate around the stator sleeve 2.

The propeller 6 is fixed to the outer wall of the rotor sleeve. Maximum diameter of the propeller 6 is smaller than the inner diameter of the housing. Due to the rotation of the rotating sleeve 4, the propeller 6 will be driven to rotate, so that the water flowing into the diversion channel 18 in the housing will provide the underwater propeller with thrust opposite to the direction of the water flowing.

According to the prior art, a propeller is driven by a motor which operates as an independent whole, a shaft driven by the motor in turn drives the propeller to rotate through the shaft. However, the underwater propeller disposed by the above embodiments directly improves the structure of the motor. The motor stator is disposed in the stator sleeve, the motor rotor is fixed in the rotor sleeve, and the rotor sleeve can rotate around the stator sleeve. Moreover, according to the underwater propeller of the above embodiments, the propeller is directly fixed to the outer wall of the rotor sleeve, so that when the motor rotor rotates, the rotor sleeve can be driven to rotate, thereby driving the propeller fixed to the rotor sleeve. In the underwater propeller disposed by the above embodiments, the propeller is fixed to the rotor sleeve directly, so that the structure of the motor is very compact and shaft transmission is not necessary, so that the length of the underwater propeller in the axial direction is greatly reduced and the overall volume of the underwater propeller is further reduced.

Alternatively, the housing of the underwater propeller may comprise a cylinder 101, a mounting base 102, a support frame 103, a support hole 104, and a support 105.

The cylinder 101 has a cylindrical structure with two open ends. As one alternative, the cross section of the cylinder 101 may be circular, as another alternative, the cross section of the cylinder 101 may be oval or the like. As an alternative, the material of the cylinder 101 may be metal. As another alternative, the material of the cylinder 101 may also be a high-strength polymer material. The embodiments of the present application do not apply restriction to the material of the cylinder 101.

The mounting base 102 has an annular structure. A plurality of supports 105 are distributed on the outer wall of the annular structure of the mounting base 102. One end of the support 105 is fixed to the mounting base 102, and the other end is fixed to the inner wall of the cylinder. As one alternative, the support 105 may be rod-shaped. Alternatively, the support 105 may be plate-shaped.

The function of the mounting base 102 is to support the motor stator, motor rotor and propeller. The mounting base and stator sleeve are disposed in such a way that the opening of the stator sleeve 2 is sealingly fixed with one end surface of the annular structure of the mounting base. Alternatively, the mounting base and the stator sleeve may be integrally formed. Alternatively, when the mounting base and the stator sleeve are in a split structure, the mounting base and the stator sleeve can be fixed by glue. Of course, as an alternative, when both the mounting base and the stator sleeve are made of metal, they can also be fixed by welding.

Alternatively, the axis of the annular structure of the mounting base 102 may coincide with the axis of the cylinder 101, so that the mounted motor stator, motor rotor and propeller are located at the axis of the housing, which improves the stability of the propeller during operating in the housing.

Alternatively, the support frame 103 is two concentric rings, and the two concentric rings are connected by a plurality of distributed support rods. The position of the support frame 103 is located at the opening position of one end of the cylinder 101. The function of the support frame 103 is to cooperate with the mounting base 102 to fix the motor stator, motor rotor and propeller into the cylinder 101. Alternatively, as shown in FIG. 2, the support frame 103 is disposed with a support hole 104, and the axis of the support hole 104 coincides with the axis of the cylinder 101, which improves the stability of the rotor sleeve during its rotating around the stator sleeve.

Alternatively, on the basis of the above embodiments, the underwater propeller may further comprise a first bearing 7, a second bearing 8 and a convex shaft 9.

The opening position of the outer wall of the stator sleeve 2 may be disposed with a stator bearing mounting groove 15. A rotor bearing mounting groove 19 is disposed at the opening position of the inner wall of the rotor sleeve 4. The opening direction of the rotor sleeve 4 is the same as the opening direction of the stator sleeve 2, and the axis of the rotor sleeve coincides with the axis of the stator sleeve, so that when the stator sleeve 2 is disposed on the rotor sleeve 4, the stator bearing mounting groove 15 and the rotor bearing mounting groove 19 can form an annular mounting space jointly.

Alternatively, the first bearing 7 is mounted in an annular mounting space which can be formed by the stator bearing mounting groove 15 and the rotor bearing mounting groove 19. The rotor sleeve 4 can rotate around the stator sleeve 2 through the first bearing 7. Alternatively, the first bearing 7 may be an ultra-thin bearing.

Alternatively, the convex shaft 9 is disposed on the bottom outer wall of the rotor sleeve 4. When the rotor sleeve 4 is disposed on the stator sleeve 2 and the support frame 103 is fixed at the opening position of the housing 1, the position of the convex shaft 9 on the rotor sleeve 4 exactly corresponds to the position of the support hole 104 on the support frame 103, and the convex shaft extends into the support hole 104.

The second bearing 8 is disposed between the support hole 104 and the convex shaft 9. The second bearing 8 allows the convex shaft 9 to rotate in the support hole 104. Alternatively, the axis of the convex shaft 9 coincides with the axis of the rotor sleeve 4 to facilitate rotation of the rotor sleeve.

With the above arrangement, the rotor sleeve and the stator sleeve can be completely fixed inside the housing 1, and the rotor sleeve 4 can freely rotate around the stator sleeve.

Figure 7:
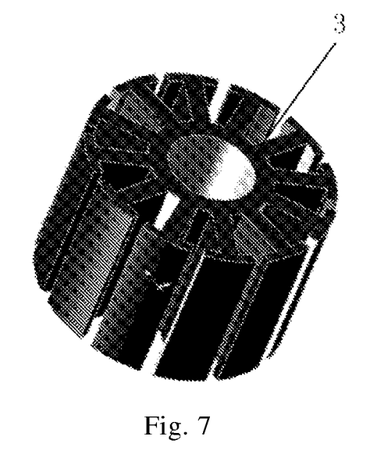
FIG. 7 shows a schematic structural diagram of a motor stator according to an embodiment of the present application.
Figure 8:
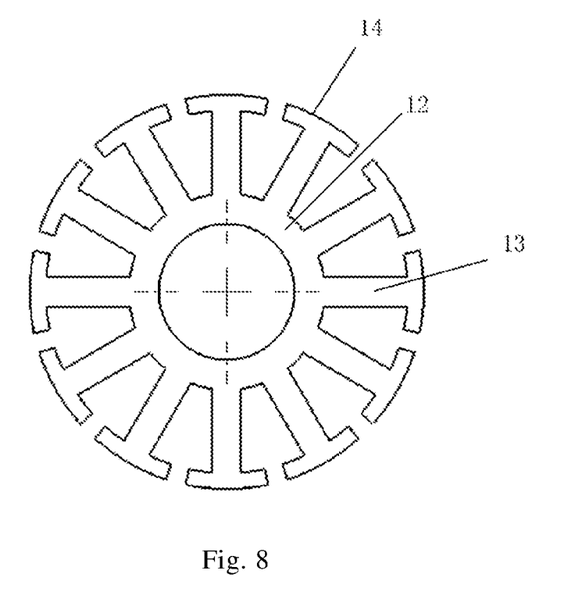
FIG. 8 shows a schematic view of an end surface of a motor stator according to an embodiment of the present application.

Alternatively, as shown in FIGS. 7 and 8, the motor stator 3 may comprise a stator fixing base 12, a stator support plate 13, and an arc plate 14. The stator fixing base 12 may be of an annular structure or a cylinder structure. For example, in this embodiment, the stator fixing base 12 adopts an annular structure. A plurality of stator support plates 13 are distributed on the outer peripheral side wall of the stator fixing base 12 uniformly. One side of the stator support plate 13 is fixed to the stator fixing base 12, and the other side is fixed to the arc plate 14. A plurality of arc plates 14 encloses a ring shape, and grooves are arranged between two adjacent arc plates.

Alternatively, the outer diameter of the motor stator 3 matches the inner wall of the stator sleeve 2. The inner wall of the stator sleeve 2 is disposed with a plurality of convex ribs 22. The convex ribs 22 correspond to the grooves between the arc plates on the motor stator one by one. In this way, when the motor stator 3 is mounted on the stator sleeve 2, the convex ribs 22 matches with the grooves, so that relative movement between the electric machine stator 3 and the stator sleeve 2 can be avoided, and the stability of the electric machine stator can be improved.

Alternatively, as shown in FIG. 1, the underwater propeller may further comprise a first seal 10.

The first seal 10 is fixed to the inner wall of the mounting base. The position of the first seal 10 is located at the joint of the stator sleeve 2 and the mounting base 102. Since the first seal 10 is sealed with the inner wall of the mounting base 102, the space in the stator sleeve is completely sealed, and the motor stator located in the stator sleeve can be completely isolated from water.

Alternatively, the underwater propeller may further comprise a circuit board 21, a cable (not shown in the drawings) and a second seal 20.

The circuit board 21 is located in the internal cavity of the mounting base 102. The circuit board 21 supplies power to the motor stator and controls current parameters flowing through the motor stator.

The cable connects the circuit board with the motor stator. One end of the cable is connected with the output end of the circuit board, and the other end is connected with the motor stator through the first seal. The position where the cable passes through the first seal is sealed to ensure the tightness of the motor stator.

The second seal 20 is disposed on the mounting base at an opening position at one end away from the stator sleeve 2. The second seal 20 seals the internal cavity of the mounting base 102, so that both the circuit board and the cable located in the mounting base 102 are isolated from water.

Alternatively, the underwater propeller may further comprise an end cover 11.

The end cover 11 is two concentric rings. The two concentric rings of the end cover 11 are connected by a plurality of support rods. The end cover 11 is fixed at an opening position of one end of the cylinder away from the support frame. The function of the end cover 11 is to intercept the opening of the diversion channel, and a plurality of support rods separate the diversion channel to avoid direct entry of human hands or other foreign objects into the diversion channel, which may cause malfunction of the propeller.

Alternatively, both the support frame 103 and the end cover 11 can be fixed at the two opening positions of the cylinder in a threaded manner for ease of disassembly.

Alternatively, the underwater propeller may further comprise a first dome 16 and a second dome 17. The first dome 16 is disposed on the support frame, and the dome is located outside the housing. The second dome 17 is fixed to the end cover 11, and the second dome 17 is located outside the housing. This can reduce water resistance.

One embodiment of the present application also provides a submersible, which may comprise the underwater propeller described in any of the previous embodiments. Depending on the design of the submersible, one or more of the above-mentioned underwater propellers can be disposed in the submersible.

It should be noted that in the present application, relational terms such as "first" and "second" are used to distinguish one entity or operation from another entity or operation only, and do not necessarily require or imply any such actual relationship or order between these entities or operations. Moreover, use of the term "comprise" or any other variation thereof intends to cover a non-exclusive inclusion, such that a process, method, article, or apparatus that comprises a list of elements does not comprise only those elements but also other elements not expressly listed, and also comprises the inherent elements in such a process, method, article, or apparatus. Without further limitation, an element defined by the statement "comprises a . . . " does not mean exclusive of the presence of other identical elements in a process, method, article or device that comprises the element.

The above description is merely a specific embodiment of the present application, so that one skilled in the art can understand or realize the present application. Various modifications to these embodiments will be apparent for one skilled in the art. The general principles defined herein may be implemented in other embodiments without departing from the spirit or scope of the present application. Therefore, the present application is not to be limited to the embodiments shown herein, but is to be accorded the widest scope consistent with the principles and novel features disclosed herein.

What is claimed is:

1. An underwater propeller, comprising:
   a housing having a cylindrical structure with two open ends,
   a stator sleeve having a cylindrical structure with one open end, the stator sleeve suspended in an internal cavity of the housing, an interval disposed between an outer wall of the stator sleeve and an inner wall of the housing,
   a motor stator fixed inside the stator sleeve,
   a rotor sleeve having a cylindrical structure with one open end and disposed on the stator sleeve, a gap disposed between an inner wall of the rotor sleeve and an outer wall of the stator sleeve, the rotor sleeve rotationally connected with the stator sleeve, an bottom of the rotor sleeve rotationally connected with the housing,
   a motor rotor fixed to the inner wall of the rotor sleeve, and
   a propeller fixed to the outer wall of the rotor sleeve, maximum diameter of the propeller smaller than inner diameter of the housing.

2. The underwater propeller of claim 1, wherein a first bearing is disposed between the inner wall of the rotor sleeve and the outer wall of the stator sleeve.

3. The underwater propeller of claim 1, wherein the housing comprises:
   a cylinder having a cylindrical structure with two open ends, and coaxial with the housing,
   a mounting base having an annular structure coaxial with the cylinder and an outer wall of the annular structure of the mounting base fixed to an inner wall of the cylinder through a plurality of supporting members,
   a support frame, which is two concentric rings connected through a plurality of support rods, the support frame fixed at an opening position at one end of the cylinder and disposed with a support hole which is coaxial with the cylinder.

4. The underwater propeller of claim 3, wherein the opening of the stator sleeve is sealingly fixed with the end face of the mounting base,
   the rotor sleeve has a consistent opening direction with the stator sleeve and is coaxial with the stator sleeve.

5. The underwater propeller of claim 3, wherein the underwater propeller further comprises:
   a convex shaft arranged on the outer wall of the bottom of the rotor sleeve and coaxial with the rotor sleeve, and
   a second bearing arranged in the support hole in which the convex shaft is rotatably arranged in a support hole on the support frame through the second bearing.

6. The underwater propeller of claim 1, wherein the underwater propeller further comprises:
   a first seal sealingly fixed to the inner wall of the mounting base to seal the space between the stator sleeves.

7. The underwater propeller of claim 6, wherein the underwater propeller further comprises:
   a circuit board located in an internal cavity of the mounting base,
   a cable, of which one end is connected with the circuit board, and the other end is connected with the motor stator through the first seal, wherein a space between the cable and the first seal is sealed, and
   a second seal located at an open position of one end of the mounting base away from the stator sleeve and used for sealing the internal cavity of the mounting base.

8. The underwater propeller of claim 3, wherein the underwater propeller further comprises:
   an end cover, which is two concentric rings connected through a plurality of support rods, and fixed at an opening position of one end of the cylinder away from the support frame.

9. The underwater propeller of claim 8, wherein the support frame and the end cover are both fixed to the cylinder through threaded connection.

10. The underwater propeller of claim 1, wherein the inner wall of the stator sleeve is disposed with a plurality of convex ribs,
    external diameter of the motor stator is matched with the inner wall of the stator sleeve, and a plurality of grooves matching with the convex ribs are arranged on the outer wall of the motor stator for fixing the motor stator in the stator sleeve.

11. The underwater propeller of claim 1, wherein pitch of the propeller is 100 mm to 135 mm.

12. A submersible comprising an underwater propeller of claim 1.

\* \* \* \* \*